US008072983B2

(12) United States Patent
Xiao et al.

(10) Patent No.: US 8,072,983 B2

(45) Date of Patent: Dec. 6, 2011

(54) METHOD AND APPARATUS FOR DISPATCHING SIGNALS IN AN OPTICAL TRANSPORT NETWORK

(75) Inventors: Xin Xiao, Shenzhen (CN); Buyun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 12/433,524

(22) Filed: Apr. 30, 2009

(65) Prior Publication Data

US 2009/0208218 A1 Aug. 20, 2009

Related U.S. Application Data

(63) Continuation of application No. PCT/CN2007/070201, filed on Jun. 28, 2007.

(30) Foreign Application Priority Data

Nov. 1, 2006 (CN) .......................... 2006 1 0137981

(51) Int. Cl.
*H04L 12/28* (2006.01)
*H04L 12/16* (2006.01)
*H04J 3/24* (2006.01)
*H04J 14/02* (2006.01)

(52) U.S. Cl. ........ 370/394; 370/352; 370/389; 370/392; 370/466; 370/474; 370/230; 370/236; 370/260; 398/46; 398/54; 398/79; 398/183; 398/202

(58) Field of Classification Search ........... 370/389–503
See application file for complete search history.

(56) References Cited

U.S. PATENT DOCUMENTS 7,103,278 B2 * 9/2006 Traverso ......................... 398/79
7,286,487 B2 * 10/2007 Perkins et al. ................ 370/253
7,415,207 B2 * 8/2008 Lanzone et al. ................ 398/46
7,492,774 B2 * 2/2009 Lohr ............................ 370/401
7,499,407 B2 * 3/2009 Holness et al. ............... 370/242
7,539,196 B2 * 5/2009 Flavin et al. .................. 370/394
7,633,952 B2 * 12/2009 Ong et al. ..................... 370/400
7,710,864 B2 * 5/2010 Binetti et al. ................. 370/218
7,742,502 B2 * 6/2010 Vissers et al. ................ 370/473

(Continued)

FOREIGN PATENT DOCUMENTS

CN 1791278 6/2006

(Continued)

OTHER PUBLICATIONS

Written Opinion issued in corresponding PCT application No. PCT/CN2007/070201, dated Sep. 27, 2007; total 3 pages.

(Continued)

*Primary Examiner* — Ayaz Sheikh
*Assistant Examiner* — Venkatesh Haliyur

(57) ABSTRACT

Methods and apparatuses for dispatching OTN signals are disclosed. The method includes receiving an OTN signal frame; determining in sequence whether each byte in the OTN signal frame is an overhead byte; determining, if the byte is an overhead byte, whether the byte includes frame alignment data; and assigning, if the byte includes frame alignment data, the byte in sequence to a corresponding channel based on a sequence number of an OTN signal frame period, or storing, if the byte does not include frame alignment data, the byte in a buffer; or assigning, if the byte is not an overhead byte, the byte in sequence to a corresponding channel based on a location of the byte in the OTN signal frame.

16 Claims, 10 Drawing Sheets

U.S. PATENT DOCUMENTS

| | | | | |
|---|---|---|---|---|
| 7,787,448 | B2 * | 8/2010 | Zhang | 370/389 |
| 7,804,853 | B2 * | 9/2010 | Lanzone et al. | 370/471 |
| 7,936,788 | B2 * | 5/2011 | Zhang | 370/481 |
| 2002/0080442 | A1 | 6/2002 | Beisel et al. | |
| 2003/0016416 | A1 * | 1/2003 | Wolf | 359/139 |
| 2003/0048813 | A1 | 3/2003 | Lahav et al. | |
| 2004/0013137 | A1 * | 1/2004 | Lohr | 370/539 |
| 2004/0062277 | A1 * | 4/2004 | Flavin et al. | 370/474 |
| 2004/0105456 | A1 * | 6/2004 | Lanzone et al. | 370/429 |
| 2004/0156325 | A1 * | 8/2004 | Perkins et al. | 370/299 |
| 2004/0174870 | A1 * | 9/2004 | Viks et al. | 370/358 |
| 2005/0163162 | A1 * | 7/2005 | Lanzone et al. | 370/471 |
| 2005/0286521 | A1 * | 12/2005 | Chiang et al. | 370/389 |
| 2006/0104309 | A1 * | 5/2006 | Vissers et al. | 370/474 |
| 2006/0245450 | A1 * | 11/2006 | Bleisteiner et al. | 370/466 |
| 2007/0104485 | A1 * | 5/2007 | Zhang | 398/69 |
| 2007/0201383 | A1 * | 8/2007 | Ong et al. | 370/254 |
| 2007/0264015 | A1 * | 11/2007 | Li et al. | 398/45 |

FOREIGN PATENT DOCUMENTS

| | | | |
|---|---|---|---|
| EP | 1217867 | | 6/2002 |
| EP | 1865632 | A1 | 12/2007 |
| EP | 2079177 | A1 * | 7/2009 |
| WO | WO-02063834 | | 8/2002 |
| WO | 2006102833 | A1 | 10/2006 |

OTHER PUBLICATIONS

ITU-T Recommendation G.709/Y.1331:"Interfaces for the optical transport network (OTN)",dated Mar. 2003, total 14 pages.

* cited by examiner

| | 1 ... 6 | 7 ... 14 | 15 | 16 | 17 | 18 | 19 | 20 | ... | 3824 | 3825 ... 4080 |
|---|---|---|---|---|---|---|---|---|---|---|---|
| 1 | OTU2 FA | OTU2 OH | OPU2 OH | JOH ODU1 #1 | ODU1 #1 | ODU1 #2 | ODU1 #3 | ODU1 #4 | ... | | OTU2 FEC |
| ⋮ | ODU2 OH | | | | | | | | | | |
| 4 | | | | | | | | | | | |
| | OTU2 FA | OTU2 OH | OPU2 OH | JOH ODU1 #2 | ODU1 #1 | ODU1 #2 | ODU1 #3 | ODU1 #4 | ... | | OTU2 FEC |
| | ODU2 OH | | | | | | | | | | |
| | OTU2 FA | OTU2 OH | OPU2 OH | JOH ODU1 #3 | ODU1 #1 | ODU1 #2 | ODU1 #3 | ODU1 #4 | ... | | OTU2 FEC |
| | ODU2 OH | | | | | | | | | | |
| | OTU2 FA | OTU2 OH | OPU2 OH | JOH ODU1 #4 | ODU1 #1 | ODU1 #2 | ODU1 #3 | ODU1 #4 | ... | | OTU2 FEC |
| | ODU2 OH | | | | | | | | | | |

METHOD AND APPARATUS FOR DISPATCHING SIGNALS IN AN OPTICAL TRANSPORT NETWORK

CROSS-REFERENCE TO RELATED APPLICATIONS

This application is a continuation of International Application No. PCT/CN2007/070201, filed Jun. 28, 2007, which claims the benefit of Chinese Application No. 200610137981.X, filed Nov. 1, 2006, both of which are hereby incorporated by reference in their entireties.

FIELD OF THE INVENTION

The present invention relates to optical transport network, and more specifically to methods and apparatuses for dispatching signals in an optical transport network.

BACKGROUND

In the beginning of 1990s, the transport network evolved from a Plesiochronous Digital Hierarchy (PDH) network to a Synchronous Digital Hierarchy (SDH) network, providing a synchronous transport platform with large capacity for voice services and data services. With the rapid development of the bandwidth for data services, the bandwidth and dispatching capability of the single wavelength SHD network no longer satisfy the growing demand. A Dense Wavelength Division Multiplexing (DWDM) network can well address the issue of lack of bandwidth. The DWDM network, when converged with an Optical Transport Network (OTN) technology, can provide an administrative monitoring OTN network with a great network survivability and a powerful dispatching capability on the basis of wavelength and sub-wavelength level. With such OTN network, wavelength and sub-wavelength service can be provided rapidly.

The dispatching capability of OTN network primarily includes Optical Channel (OCh) dispatching capability based on wavelength level and Optical channel Data Unit-k (ODUk) dispatching capability based on sub-wavelength level.

The OCh dispatching technology on wavelength level, widely adopted by the industry, includes a Reconfigurable Optical Add-Drop Multiplexer (ROADM), Wavelength Selective Switch (WSS), etc., offering flexible wavelength selection and Add-Drop multiplexing functions.

ODUk dispatching based on sub-wavelength level supports 3 types of rate granularities: ODU1 of 2.5 Gbps, ODU2 of 10 Gbps and ODU3 of 40 Gbps. An asynchronous space division dispatching chip can be used to implement the space division dispatching with the above granularities. A relatively mature one used in the industry is the asynchronous space division cross connect chip at a granularity of 2.5 Gbps.

The structure of an ODUk (k=1, 2, 3) frame is similar to that of an OTUk. FIG. 1 illustrates a format of OTUk (k=1, 2, 3) frame. As shown in FIG. 1, OTUk frame has a block structure with a size of 4 rows×4080 bytes/row including a 4×16 overhead portion, a 4×3808 payload portion and a 4×256 forward error control (FEC) portion. The 4×16 overhead portion primarily includes an OTUk frame alignment (FA) data situated in row 1, bytes 1~6, OTUk overhead (OH) data situated in row 1, bytes 7~14, ODUk overhead (OH) data situated in row 2~4, bytes 1~16, and OPUk OH data situated in rows 1~4, bytes 15~16, where k=1, 2, 3.

ODUk (k=1, 2, 3) frame plus FEC portion forms the OTUk frame. The size of the ODUk frame is 4 rows×3824 bytes/row=15296 bytes.

Considering that the current asynchronous space division dispatching is at a granularity of 2.5 Gbps, OTU1/ODU1 signal does not have the issue of splitting and combination. The existing asynchronous space division dispatching is to split OTUk/ODUk (k=2, 3) signal into a plurality of units each having 16 bytes, thus forming a plurality of signals at 2.5 Gbps level. For instance, OTU2/ODU2 signal of 10 Gbps needs to be split into 4-bit parallel signals. OTU3/ODU3 signal of 40 Gbps needs to be split into 16-bit parallel signals.

When splitting, the following should be considered. In order to recover the original signal from the split signals, sink frame alignment needs to be performed on each split signal, which means that the FA data, i.e., bytes 1~6 in row 1 of each frame, are assigned in average to a signal of 2.5 Gbps in each channel.

FIG. 2 is a schematic of existing process for splitting OTU2 signals. Referring to FIG. 2, the splitting process is as follows.

At the transmitting side, the splitting process is as follows.

1. The process for splitting OTU2 signals received during the 4n+1th (n=0, 1, 2 . . . ) frame period is described below.

Bytes 1~16 in each row are assigned to a first signal channel of 2.5 Gbps, i.e., a first channel. Bytes 17~32 in each row are assigned to a second channel. Bytes 33~48 in each row are assigned to a third channel. Bytes 49~64 in each row are assigned to a fourth channel. Bytes 65~80 in each row are assigned to the first channel. Bytes 81~96 in each row are assigned to the second channel . . . . The rest may be deduced by analogy until all the data in each row included in the frame are assigned.

2. The process for splitting OTU2 signals received during the 4n+2th (n=0, 1, 2 . . . ) frame period is described below.

Bytes 1~16 in each row are assigned to the second channel. Bytes 17~32 in each row are assigned to the third channel. Bytes 33~48 in each row are assigned to the forth channel. Bytes 49~64 in each row are assigned to the first channel. Bytes 65~80 in each row are assigned to the first channel. Bytes 81~96 in each row are assigned to the second channel . . . . The rest may be deduced by analogy until all the data in each row included in the frame are assigned.

3. The process for splitting OTU2 signals received during the 4n+3th (n=0, 1, 2 . . . ) frame period is described below.

Bytes 1~16 in each row are assigned to the third channel. Bytes 17~32 in each row are assigned to the fourth channel. Bytes 33~48 in each row are assigned to the first channel. Bytes 49~64 in each row are assigned to the second channel. Bytes 65~80 in each row are assigned to the first channel. Bytes 81~96 in each row are assigned to the second channel . . . . The rest may be deduced by analogy until all the data in each row included in the frame are assigned.

4. The process for splitting OTU2 signals received during the 4n+4th (n=0, 1, 2 . . . ) frame period is described below.

Bytes 1~16 in each row are assigned to the fourth channel. Bytes 17~32 in each row are assigned to the first channel. Bytes 33~48 in each row are assigned to the second channel. Bytes 49~64 in each row are assigned to the third channel. Bytes 65~80 in each row are assigned to the first channel. Bytes 81~96 in each row are assigned to the second channel . . . . The rest may be deduced by analogy until all the data in each row included in the frame are assigned.

At the receiving side, if the signals are received during the 4n+1th (n=0, 1, 2) frame period, sink frame alignment is performed on the signals in each channel based on the bytes 1-16 in the first channel. Then, signals in each channel are combined corresponding to the process for splitting OTU2 signals at the transmitting side.

If the signals are received during the 4n+2th (n=0, 1, 2) frame period, sink frame alignment is performed on the signals in each channel based on the bytes 1-16 in the second channel. Then, signals in each channel are combined corresponding to the process for splitting OTU2 signals at the transmitting side.

If the signals are received during the 4n+3th (n=0, 1, 2) frame period, sink frame alignment is performed on the signals in each channel based on the bytes 1-16 in the third channel. Then, signals in each channel are combined corresponding to the process for splitting OTU2 signals at the transmitting side.

If the signal is received during the 4n+4th (n=0, 1, 2) frame period, sink frame alignment is performed on the signals in each channel based on the bytes 1-16 in the fourth channel. Then, signals in each channel are combined corresponding to the process for splitting OTU2 signals at the transmitting side.

As can be seen from the above description that, the existing asynchronous space division dispatching method requires that the blocks of bytes of each OTUk (k=2, 3) signal frames divided in an integer-splitting way according to the total number of channels. That is, assume that the size of a frame is F bytes, the number of channels is C, the number of blocks of bytes is B, the size of each block of bytes is S bytes, then F=C×B×S. In the case where the size of a block of bytes is 16 bytes, since the OUT2 frame needs to be divided into 4 channels of 2.5 Gbps and the size of its block structure is 16320 bytes, then 16320=16 bytes/block×4 channels×255, i.e., the number of blocks of bytes assigned to each channel as a result of splitting an OTU2 frame is 255. Since the OUT3 frame needs to be divided into 16 channels of 2.5 Gbps and the size of its block structure is 16320 bytes, then 16320=16 bytes/block×16 channels×63.75, i.e., the number of blocks of bytes assigned to each channel as a result of splitting an OTU3 frame is 63.75 which is not an integer. Hence, the existing asynchronous space division dispatching cannot manage the OTU3 signals.

SUMMARY

The present invention provides methods and apparatuses for dispatching OTN signals so that the OTN signals can be adjusted in a widened range.

The technical solutions according to the embodiments of the present invention are detailed as follows.

A method for dispatching optical transport network (OTN) signal includes: receiving an OTN signal frame; determining in sequence whether each byte in the OTN signal frame is an overhead byte; determining, if the byte is an overhead byte, whether the byte includes frame alignment data; assigning, if the byte includes frame alignment data, the byte in sequence to a corresponding channel based on a sequence number of an OTN signal frame period, or storing, if the byte does not include frame alignment data, the byte in a buffer; assigning, if the byte is not an overhead byte, the byte in sequence to a corresponding channel based on a location of the byte in the OTN signal frame.

A method for dispatching optical transport network (OTN) signals includes receiving an OTN signal frame; determining in sequence whether each byte in the OTN signal frame is an overhead byte; assigning, if the byte is an overhead byte, the byte in sequence to a corresponding channel based on a sequence number of an OTN signal frame period; assigning, if the byte is not an overhead byte, the byte in sequence to a corresponding channel, based on a location of the byte in the OTN signal frame.

An apparatus for dispatching OTN signals includes:

an OTN signal receiving module, configured to receive an OTN signal frame and send the OTN signal frame to an OTN signal splitting module;

the OTN signal splitting module, configured to: receive the OTN signal frame sent from the OTN signal receiving module, and determine in sequence whether each byte in the OTN signal frame is an overhead byte; if the byte is an overhead byte, the OTN signal splitting module determine whether the byte contains frame alignment data, assign the byte in sequence to a corresponding channel based on a sequence number of an OTN signal frame period if the byte contains the frame alignment data, or store the byte in a buffer if the byte does not contain the frame alignment data; if the byte is not an overhead byte, the OTN signal splitting module assign the byte in sequence to a corresponding channel based on a column sequence number of the byte in the OTN signal frame; and a buffer module, configured to receive and store the overhead bytes from the OTN signal splitting module.

An apparatus for dispatching OTN signals includes:

an OTN signal receiving module, configured to receive an OTN signal frame and send the OTN signal frame to an OTN signal splitting module; and the OTN signal splitting module, configured to: receive an OTN signal frame sent from the OTN signal receiving module and determine in sequence whether each byte in the OTN signal frame is an overhead byte; if the byte is an overhead byte, the OTN signal splitting module assign the byte to a corresponding channel based on a sequence number of the OTN signal frame period; if the byte is not an overhead byte, the OTN signal splitting module assign the byte to a corresponding channel based on a column sequence number of the byte in the OTN signal frame.

Compared with prior arts, the present invention assigns in sequence the overhead byte containing frame alignment data of OUTk/ODUk (k=2, 3) to each channel based on the sequence number of the current signal frame period and assigns the payload or FEC bytes in sequence to each channel based on location of the payload or FEC byte in the current frame. In this way, the present invention not only realizes the dispatching of the OTU2/ODU2 signal, but also realizes the dispatching of the OTU3/ODU3 signal, thus expanding the schedulable range of the OTN signal and providing a simple implementation.

DETAILED DESCRIPTION

International Telecommunication Union-Telecommunications Standards section (ITU-T) G.709 proposes and defines a time division multiplexing functionality among ODUk (d=1, 2, 3) signals. The definition is described below.

4×ODU1→OPU2 Payload→ODU2;

16×ODU1→OPU3 Payload→ODU3;

4×ODU2→OPU3 Payload→ODU3;

4×ODU1→OPU2 Payload→ODU2 is explained as an example of the time division multiplexing functionality. 4 ODU1 signals of 2.5 Gbps are encapsulated in succession into the payload portion of ODU2 signals in accordance with the byte sequence number. In this way, the ODU1 signal which was supposed to be transmitted on 4 lines with wavelength of 2.5 Gbps is transformed to be transmitted on a line with a wavelength of 10 Gbps. As a result, the line resources are saved.

Figure 1:
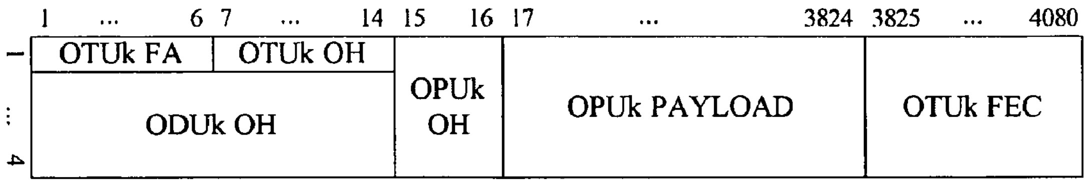
FIG. 1 illustrates a format of an OTUk frame.
Figure 2:
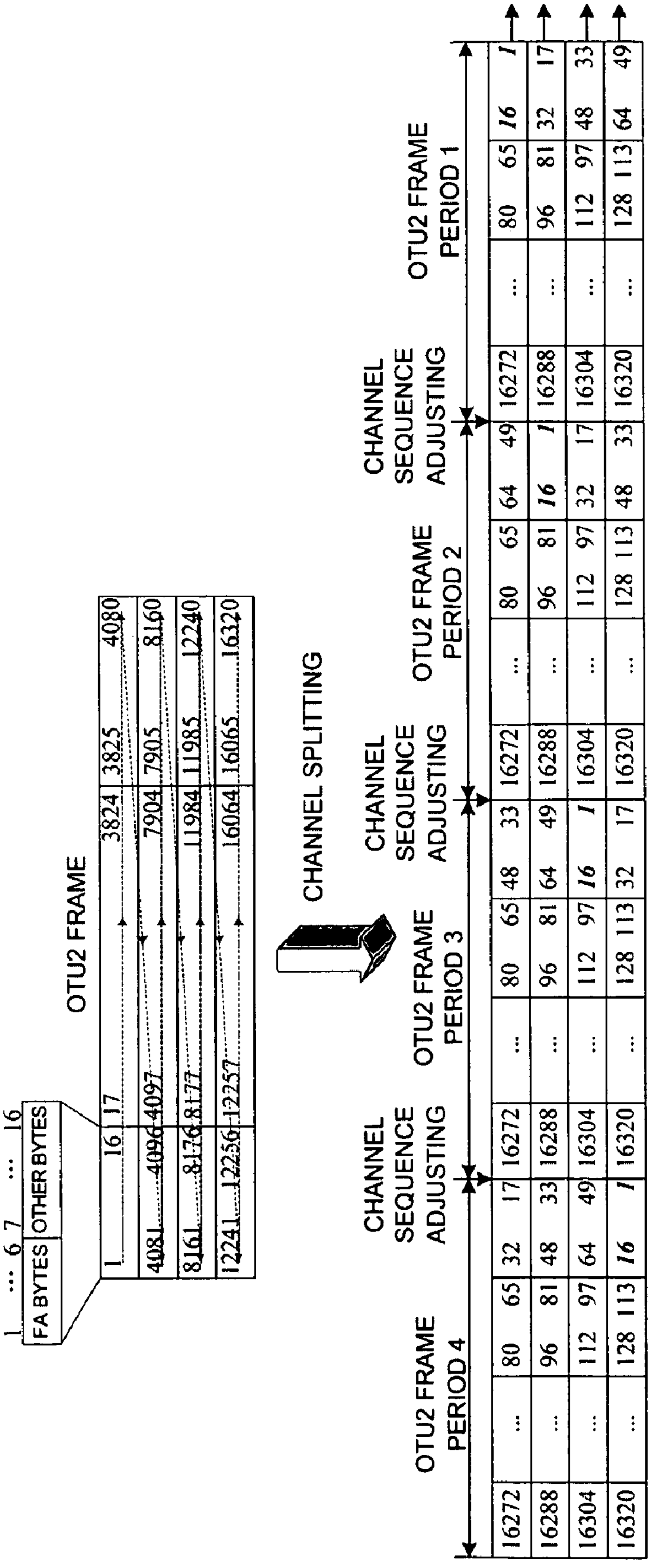
FIG. 2 illustrates the process for splitting the OTUk/ODUk (k=2, 3) signal according to the prior art.
Figure 3:
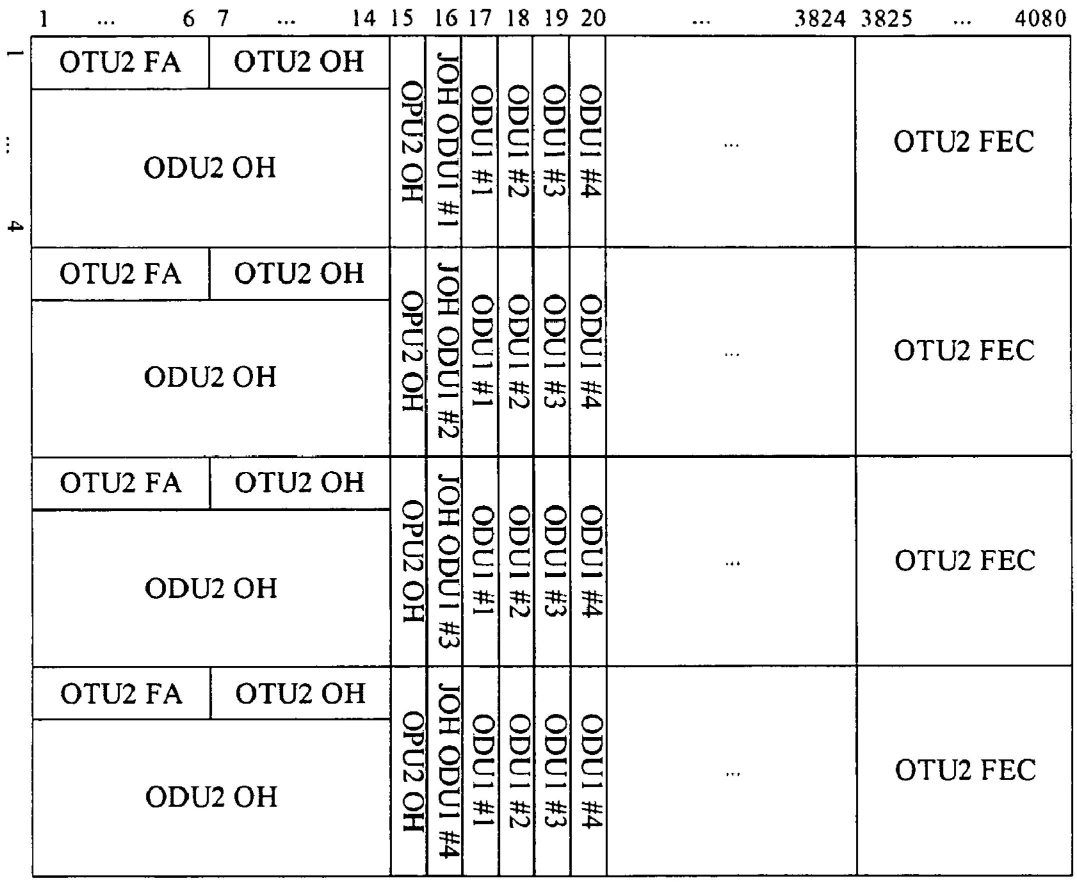
FIG. 3 illustrates a structure of an ODU2 signal encapsulated by 4 ODU1 signals proposed by G.709.

The structure of an ODU2 signal frame made up of 4 ODU1 signals is illustrated in FIG. 3. The first byte in the first ODU1 signal, i.e., ODU1#1 in FIG. 3 is encapsulated into the first byte in the payload portion of ODU2 signal. The first byte in the second ODU1 signal, i.e., ODU1#2 in FIG. 3 is encapsulated into the second byte in the payload portion of ODU2 signal. The first byte in the third ODU1 signal, i.e., ODU1#3 in FIG. 3 is encapsulated into the third byte in the payload portion of ODU2 signal. The first byte in the fourth ODU1 signal, i.e., ODU1#4 in FIG. 3 is encapsulated into the fourth byte in the payload portion of ODU2 signal. The second byte of the first ODU1 signal is encapsulated in the fifth byte in the payload portion of ODU2 signal. The second byte of the second ODU1 signal is encapsulated in the sixth byte in the payload portion of ODU2 signal, . . . , and the rest may be deduced by analogy.

Therefore, when an OTU2/ODU2 signal of 10 Gbps is received, the signal may be transformed from 4 ODU1 signals of 2.5 Gbps, or the signal may be an ordinary OTU2/ODU2 signal. Considering the complexity of combing the split signals, the present invention treats all OTU2/ODU2 signals as being transformed from 4 ODU1 signals. The basic splitting concept is explained below.

The data which belongs to a first ODU1 signal, i.e., bytes 1, 5, 9 in the payload portion in each row of each frame, are assigned to a first channel. The data which belongs to a second ODU1 signal, i.e., bytes 2, 6, 10 in the payload portion in each row of each frame, are assigned to a second channel. The data which belongs to a third ODU1 signal, i.e., bytes 3, 7, 11 in the payload portion in each row of each frame, are assigned to a third channel. The data which belongs to a fourth ODU1 signal, i.e., bytes 4, 8, 12 in the payload portion in each row of each frame, are assigned to a fourth channel.

An OTU2 signal is described in detail as an example for illustration of dispatching OTN signals according to an embodiment of the present invention.

Figure 4:
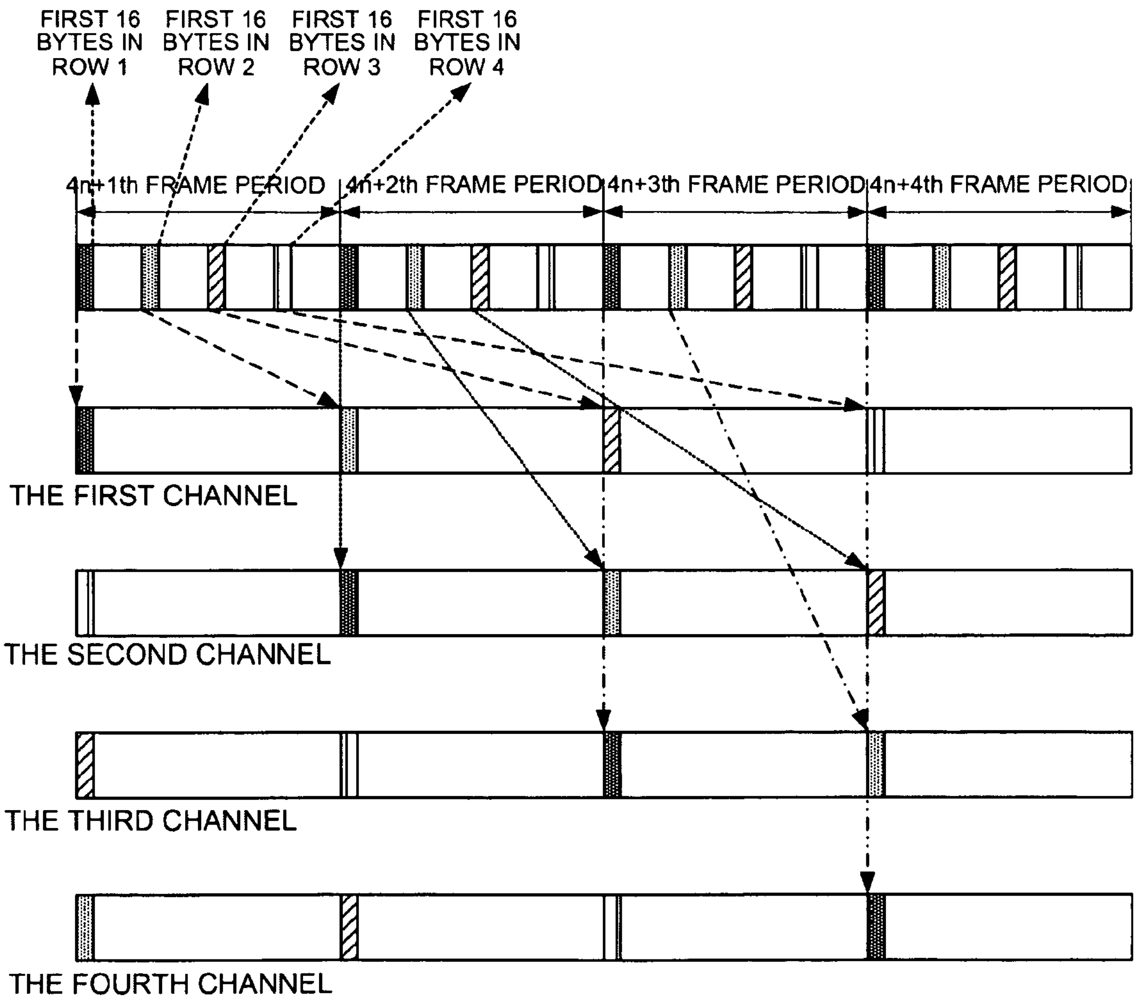
FIG. 4 illustrates a process of splitting OTU2 signals according to a first embodiment of the present invention.

FIG. 4 is an illustration of the splitting of OTU2 signals according to a first embodiment of the present invention. Referring to FIG. 4, the splitting process is as follows.

1. The process for splitting OTU2 signals received during the 4n+1th (n=0, 1, 2 . . . ) frame period is described below.

Bytes 1~16 in the first row in the frame are assigned to the first channel. Bytes 1~16 in the rows 2~4 are stored in a buffer. Bytes 1~16 in the fourth row of the signal frames stored during the 4n−2th frame period are assigned to the second channel. Bytes 1~16 in the third row of the signal frames stored during the 4n−1th frame period are assigned to the third channel. Bytes 1~16 in the second row of the signal frames stored during 4nth frame period are assigned to the fourth channel.

Each byte in the payload portion and FEC portion of this frame is assigned to each channel respectively. Specifically, byte 17 in each row is assigned to the first channel. Byte 18 is assigned to the second channel. Byte 19 is assigned to the third channel. Byte 20 is assigned to the fourth channel. Byte 21 is assigned to the first channel. Byte 22 is assigned to the second channel, . . . , and the rest may be deduced by analogy.

2. The process for splitting OTU2 signals received during the 4n+2th (n=0, 1, 2 . . . ) frame period is described below.

Bytes 1~16 in each row in the frame are assigned to the second channel. Bytes 1~16 in the rows 2~4 are stored in a buffer. Bytes 1~16 in the second row of the signal frames stored during the 4n+1th frame period are assigned to the first channel. Bytes 1~16 in the fourth row of the signal frame stored during the 4n−1th frame period are assigned to the third channel. Bytes 1~16 in the third row of the signal frame stored during the 4nth frame period are assigned to the fourth channel.

Each byte in the payload portion and FEC portion of this frame is assigned to each channel respectively. Specifically, byte 17 in each row is assigned to the first channel. Byte 18 is assigned to the second channel. Byte 19 is assigned to the third channel. Byte 20 is assigned to the fourth channel. Byte 21 is assigned to the first channel. Byte 22 is assigned to the second channel, . . . , and the rest may be deduced by analogy.

3. The process for splitting OTU2 signals received during the 4n+3th (n=0, 1, 2 . . . ) frame period is described below.

Bytes 1~16 in each row in the frame are assigned to the third channel. Bytes 1~16 in the rows 2~4 are stored in a buffer. Bytes 1~16 in the third row of the signal frame stored during the 4n+1th frame period are assigned to the first channel. Bytes 1~16 in the second row of the signal frame stored during the 4n+2th frame period are assigned to the second channel. Bytes 1~16 in the fourth row of the signal frame stored during the 4nth frame period are assigned to the fourth channel.

Each byte in the payload portion and FEC portion of this frame is assigned to each channel respectively. Specifically, byte 17 in each row is assigned to the first channel. Byte 18 is assigned to the second channel. Byte 19 is assigned to the third channel. Byte 20 is assigned to the fourth channel. Byte 21 is assigned to the first channel. Byte 22 is assigned to the second channel, . . . , and the rest may be deduced by analogy.

4. The process for splitting OTU2 signals received during frame 4n+4th (n=0, 1, 2 . . . ) frame period is described below.

Bytes 1~16 in each row in the frame are assigned to the fourth channel. Bytes 1~16 in the rows 2~4 are stored in a buffer. Bytes 1~16 in the fourth row of the signal frame stored during the 4n+1th frame period are assigned to the first channel. Bytes 1~16 in the third row of the signal frame stored during the 4n+2th frame period are assigned to the second channel. Bytes 1~16 in the second row of the signal frame stored during the 4n+3th frame period are assigned to the third channel.

Each byte in the payload portion and FEC portion of this frame is assigned to each channel respectively. Specifically, byte 17 in each row is assigned to the first channel. Byte 18 is assigned to the second channel. Byte 19 is assigned to the third channel. Byte 20 is assigned to the fourth channel. Byte 21 is assigned to the first channel. Byte 22 is assigned to the second channel, . . . , and the rest may be deduced by analogy.

Figure 5:
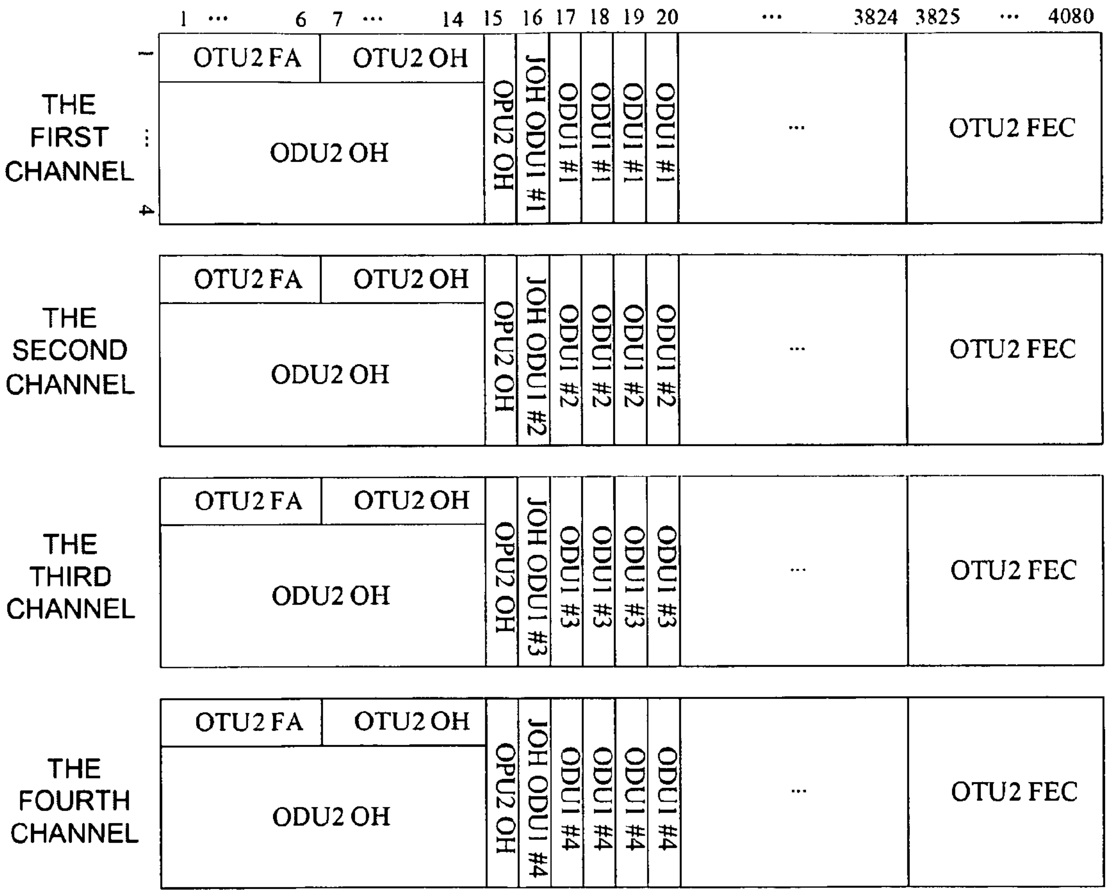
FIG. 5 illustrates structures of signals in each channel after the OTU2 signals are split according to an embodiment of the present invention.

After the OTU2 signal is split onto four channels, the structure of the signals in each channel is as illustrated in FIG. 5.

At the OTU2 signal receiving side, if signals are received during the 4n+1th frame period, sink frame alignment is performed on the signals in each channel based on the frame alignment (FA) bytes 1-6 in the first channel. Then, the signals in each channel are combined in accordance with the splitting process at the transmitting side.

If signals are received during the 4n+2th frame period, sink frame alignment is performed on the signals in each channel based on the FA bytes 1-6 in the second channel. Then, the signals in each channel are combined in accordance with the splitting process at the transmitting side.

If the received signal corresponds to the signal during frame 4n+3, sink frame alignment is performed on the signals in each channel based on the FA bytes 1-6 in the third channel. Then, the signals in each channel are combined in accordance with the splitting process at the transmitting side.

If signals are received during the 4n+4th frame period, sink frame alignment is performed on the signals in each channel based on the frame alignment bytes 1-6 in the fourth channel. Then, the signals in each channel are combined in accordance with the splitting process at the transmitting side.

Figure 6:
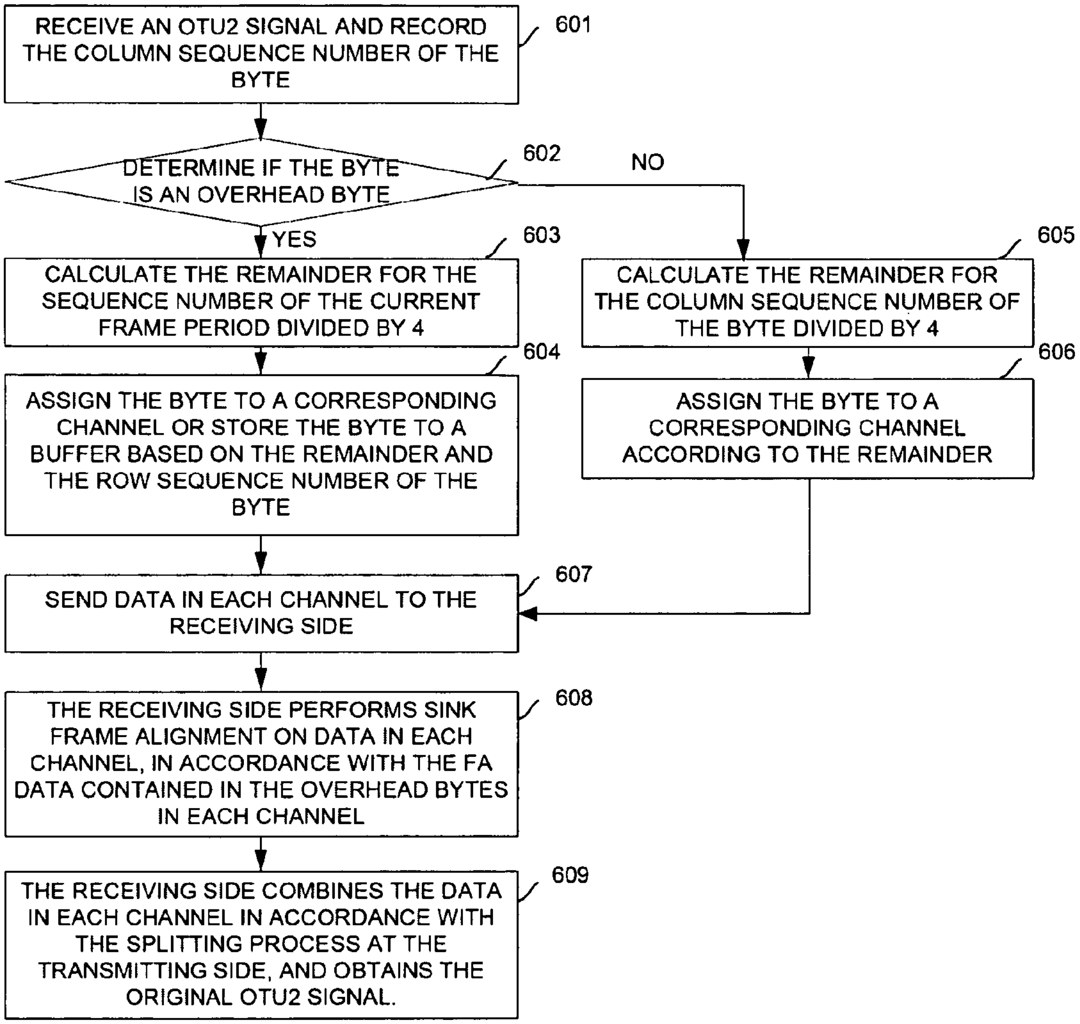
FIG. 6 illustrates a process of managing OTU2 signals according to a first embodiment of the present invention.

FIG. 6 illustrates a flowchart of managing OTU2 signals based on the foregoing splitting process according to the first embodiment of the present invention.

In Step 601, an OTU2 signal frame of 10 Gbps is received and the column sequence number of a current byte in the current signal frame is recorded.

The OTU2 signal frame includes 4 rows×4080 columns bytes. Bytes in columns 1~16 are overhead bytes containing FA data. Bytes in columns 1~6 are FA data. Bytes in columns 17~3824 are payload data. Bytes in columns 3825~4080 are FEC data.

In Step 602, it is determined whether the byte is an overhead byte based on the column sequence number of the byte. If it is an overhead byte, the process proceeds to step 603; otherwise, the process proceeds to step 605.

In Step 603, the remainder a for the sequence number of the current OTU2 signal frame period divided by 4 is calculated.

In Step 604, the byte is assigned to a corresponding channel or stored to a buffer based on the remainder a and the row sequence number b where the current byte locates in the current frame. The process proceeds to step 607.

For instance, 1) if the remainder a is 1, then when b=1, this byte is assigned to the first channel. Meanwhile, bytes 1~16 in row 4 of the signal frame stored in the 3 frames prior to the current frame are assigned to the second channel. Bytes 1~16 in row 3 of the signal frame stored in the 2 frames prior to the current frame are assigned to the third channel. Bytes 1~16 in row 2 of the signal frame stored in the 1 frame prior to the current frame are assigned to the fourth channel.

When b=2~4, the byte is stored in a buffer.

2) if the remainder a is 2, then when b=1, this byte is assigned to the second channel. Meanwhile, bytes 1~16 in row 2 of the signal frame stored in the 1 frame prior to the current frame are assigned to the first channel. Bytes 1~16 in row 4 of the signal frame stored in the 3 frames prior to the current frame are assigned to the third channel. Bytes 1~16 in row 3 of the signal frame stored in the 2 frames prior to the current frame are assigned to the fourth channel.

When b=2~4, the byte is stored in a buffer.

3) if the remainder a is 3, then when b=1, this byte is assigned to the third channel. Meanwhile, bytes 1~16 in row 3 of the signal frame stored in the 2 frames prior to the current frame are assigned to the first channel. Bytes 1~16 in row 2 of the signal frame stored in the 1 frames prior to the current frame are assigned to the second channel. Bytes 1~16 in row 4 of the signal frame stored in the 3 frames prior to the current frame are assigned to the fourth channel.

When b=2~4, the byte is stored in a buffer.

4) if the remainder a is 0, then when b=1, this byte is assigned to the fourth channel. Meanwhile, bytes 1~16 in row 4 of the signal frame stored in the 3 frames prior to the current frame are assigned to the first channel. Bytes 1~16 in row 3 of the signal frame stored in the 2 frames prior to the current frame are assigned to the second channel. Bytes 1~16 in row 2 of the signal frame stored in the 1 frame prior to the current frame are assigned to the third channel.

When b=2~4, the bytes are stored in a buffer.

A principle must be followed when assigning the overhead bytes containing FA data in the first row of the signal frame to each channel. That is, in every four frame periods, it should be guaranteed that each channel is assigned once with overhead bytes containing FA data in the first row during one out of the four frame periods.

In Step 605, the remainder of the column sequence number of the byte in the current frame divided by 4 calculated.

In Step 606, the byte is assigned to a corresponding channel according to the remainder.

For instance, if the remainder is 1, the byte is assigned to the first channel. If the remainder is 2, the byte is assigned to the second channel. If the remainder is 3, the byte is assigned to the third channel. If the remainder is 0, the byte is assigned to the fourth channel.

In Step 607, data of each channel is sent to the receiving side.

Data corresponding to each channel are sent simultaneously to the receiving side. Bytes corresponding to the first, second, third, fourth channels are sent to the receiving side at the same time. Meanwhile, before the data of each channel is sent, data of each channel need to be serialized/paralleled. In other words, the parallel data of each channel need to be converted to serial data.

In practice, according to actual dispatching requirement, the transmitting side may cross-dispatch the signals in some channels split from one OTU2 signal and the signals on some channels split from another OTU2 signal and send the cross-dispatched signal to the receiving side. For instance, the signals on the first and third channels split from OTU2 signal A and the signals on the second and fourth channels split from OTU2 signal B may be transmitted together to the same receiving side.

In Step 608, after the receiving side receives data from each channel, sink frame alignment is performed on data in each channel in accordance with the FA data contained in the overhead bytes in each channel.

After the receiving side receives the data from each channel, a serial-to-parallel conversion is performed on the data. That is, the data from each channel are converted from serial data to parallel data.

For signals received in the 4n+1th frame period, sink frame alignment is performed on data of each channel according to the bytes 1~6, i.e., FA data, in row 1 on the first channel. For signals received in the 4n+2th frame period, sink frame alignment is performed on data of each channel according to the bytes 1~6, i.e., FA data, in row 1 on the second channel. For signals received in frame 4n+3, sink frame alignment is performed on data of each channel according to the bytes 1~6, i.e., FA data, in row 1 on the third channel. For signals received in frame 4n+4, sink frame alignment is performed on data of each channel according to the bytes 1~6, i.e., FA data, in row 1 on the fourth channel.

In Step 609, the receiving side combines the signals in each channel into an OTU2 signal in accordance with the process for splitting the OTU2 signals at the transmitting side.

In practice, steps 601~606 and steps 607~609 do not have to be performed in a strict order.

In accordance with the splitting process at the transmitting side, signal combining process at the receiving side can be deduced inversely, which is omitted herein for brevity.

As can be seen that, in the first embodiment shown in FIG. 4 and FIG. 6, when bytes 1~16 in rows 2~4 of each OTU2 signal frame, i.e., overhead bytes without FA data, are received, these bytes will not be assigned in real time. Rather, these bytes are stored in a buffer. Apparently, this will cause a delay in assignment. To address the delay issue, in practice, a splitting process for OTU2 signal can be adopted as shown in FIG. 7.

Figure 7:
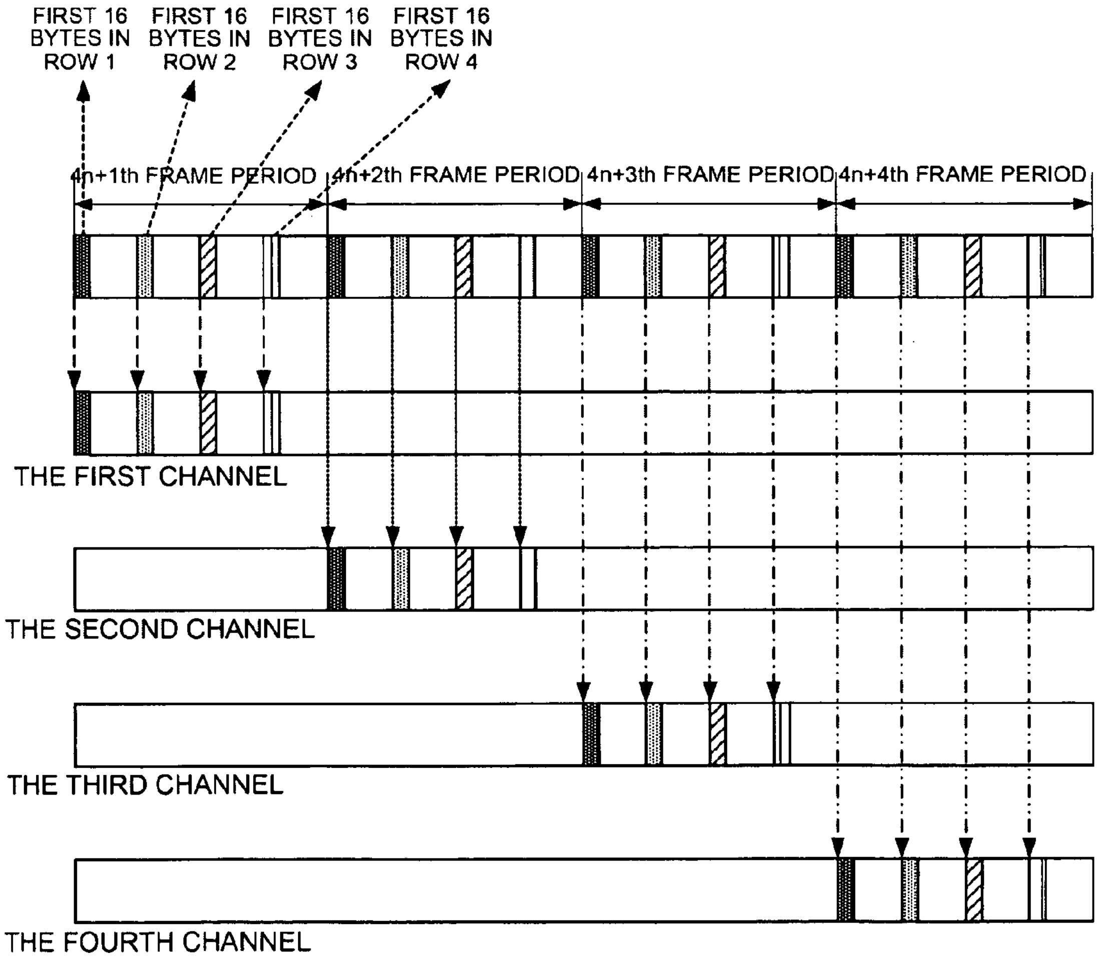
FIG. 7 illustrates a process of splitting OTU2 signals according to a second embodiment of the present invention.

FIG. 7 is an illustration of process for splitting OTU2 signals according to a second embodiment of the present invention. Referring to FIG. 7, the process splitting for OTU2 signals is as follows.

1. The process for splitting OTU2 signals received during the 4n+1th (n=0, 1, 2 . . . ) frame period is described below.

Bytes 1~16 in each row of the frame are assigned to the first channel. Each byte in the payload portion and FEC portion of the frame is assigned to each channel respectively. Specifically, byte 17 in the first row is assigned to the first channel. Byte 18 is assigned to the second channel. Byte 19 is assigned to the third channel. Byte 20 is assigned to the fourth channel. Byte 21 is assigned to the first channel. Byte 22 is assigned to the second channel, . . . , and the rest may be deduced by analogy.

2. The process for splitting OTU2 signals received during the 4n+2th (n=0, 1, 2 . . . ) is frame period described below.

Bytes 1~16 in each row of the frame are assigned to the second channel. Each byte in the payload portion and FEC portion of the frame is assigned to each channel respectively. Specifically, byte 17 in the first row is assigned to the first channel. Byte 18 is assigned to the second channel. Byte 19 is assigned to the third channel. Byte 20 is assigned to the fourth channel. Byte 21 is assigned to the first channel. Byte 22 is assigned to the second channel, . . . , and the rest may be deduced by analogy.

3. The process for splitting OTU2 signals received during the 4n+3th (n=0, 1, 2 . . . ) frame period is described below.

Bytes 1~16 in each row of the frame are assigned to the third channel. Each byte in the payload portion and FEC portion of the frame is assigned to each channel respectively. Specifically, byte 17 in the first row is assigned to the first channel. Byte 18 is assigned to the second channel. Byte 19 is assigned to the third channel. Byte 20 is assigned to the fourth channel. Byte 21 is assigned to the first channel. Byte 22 is assigned to the second channel, . . . , and the rest may be deduced by analogy.

4. The process for splitting OTU2 signal received during the 4n+4th (n=0, 1, 2 . . . ) frame period is described below.

Bytes 1~16 in each row of the frame are assigned to the fourth channel. Each byte in the payload portion and FEC portion of the frame is assigned to each channel respectively. Specifically, byte 17 in the first row is assigned to the first channel. Byte 18 is assigned to the second channel. Byte 19 is assigned to the third channel. Byte 20 is assigned to the fourth channel. Byte 21 is assigned to the first channel. Byte 22 is assigned to the second channel, . . . , and the rest may be deduced by analogy.

Likewise, at the receiving side receiving OTU2 signal, if the received signals correspond to signals during the 4n+1th (n=0, 1, 2 . . . ) frame period, sink frame alignment is performed on the signals in each channel based on the frame alignment (FA) bytes 1-6 in the first row on the first channel. Then, the signals in each channel are combined in accordance with the splitting process at the transmitting side.

If signals are received during the 4n+2th (n=0, 1, 2 . . . ) frame period, sink frame alignment is performed on the signals in each channel based on the FA bytes 1-6 in the first row on the second channel. Then, the signals in each channel are combined in accordance with the splitting process at the transmitting side.

If signals are received during the 4n+3th (n=0, 1, 2 . . . ) frame period, sink frame alignment is performed on the signals in each channel based on the FA bytes 1-6 in the first row on the third channel. Then, the signals in each channel are combined in accordance with the splitting process at the transmitting side.

If signals are received during frame the 4n+4th (n=0, 1, 2 . . . ) frame period, sink frame alignment is performed on the signals in each channel based on the FA bytes 1-6 in the first row on the fourth channel. Then, the signals in each channel are combined in accordance with the splitting process at the transmitting side.

Figure 8:
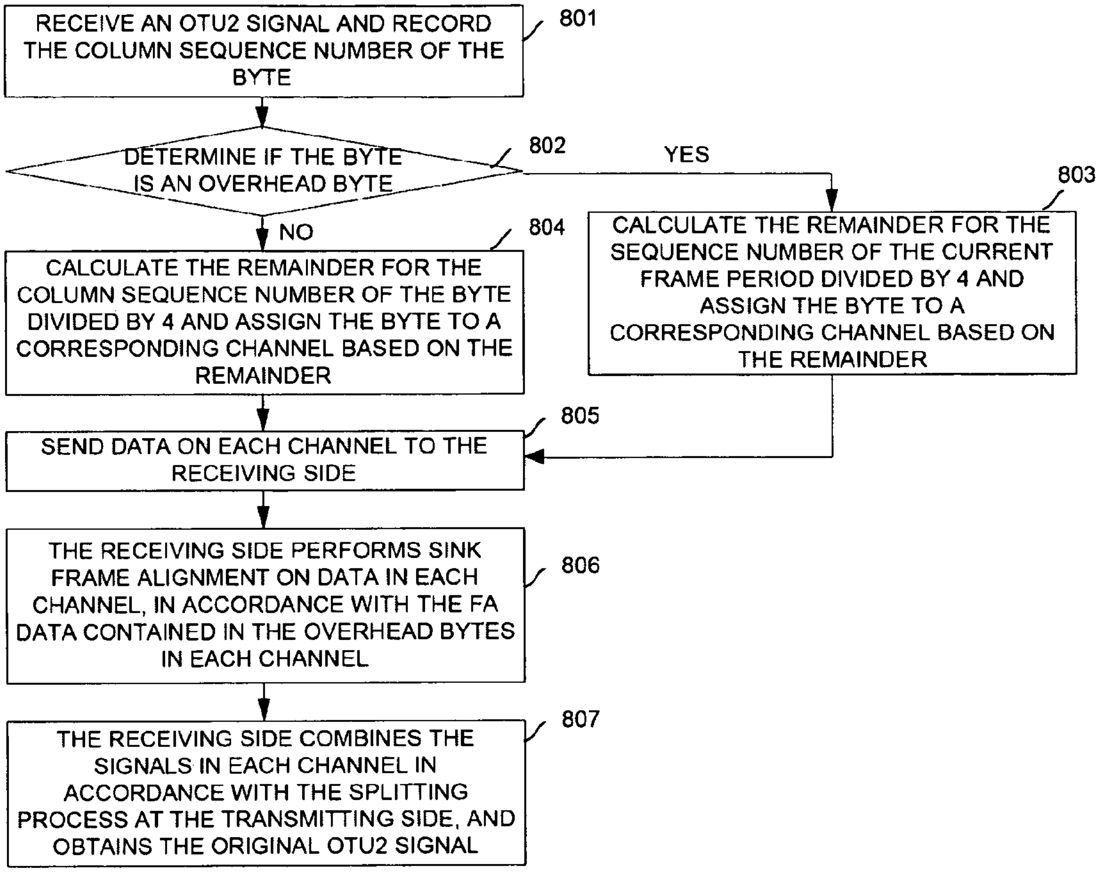
FIG. 8 illustrates a process of managing OTU2 signals according to a second embodiment of the present invention.

In accordance with the splitting process for OTU2 signal illustrated in FIG. 7, a flowchart of OTU2 signal dispatch according to the second embodiment of the present invention is as illustrated in FIG. 8. The steps are described below.

In Step 801, an OTU2 signal frame of 10 Gbps is received and the column sequence number of the current byte in the current signal frame is recorded.

In Step 802, it is determined whether the byte is an overhead byte based on the column sequence number of the byte in the current frame. If it is an overhead byte, the process proceeds to step 803; otherwise, the process proceeds to step 804.

In Step 803, the remainder for the sequence number of OTU2 signal frame period divided by 4 is calculated and the byte is assigned to a corresponding channel based on the remainder. The process proceeds to step 806.

For instance, if the remainder is 1, the overhead byte is assigned to the first channel. If the remainder is 2, the overhead byte is assigned to the second channel. If the remainder is 3, the overhead byte is assigned to the third channel. If the remainder is 0, the overhead byte is assigned to the fourth channel.

Likewise, a principle must be followed when assigning the overhead byte to each channel. Specifically, in every four frame periods, it should be guaranteed that each channel is assigned once with bytes 1~16 in the first row of OTU2 signal during one out of the four frame periods. In other words, these overhead bytes contain FA data.

In Step 804, the remainder for the column sequence number of the byte in the current frame divided by 4 is calculated and the byte is assigned to a corresponding channel based on the remainder.

If the remainder is 1, the byte is assigned to the first channel. If the remainder is 2, the byte is assigned to the second channel. If the remainder is 3, the byte is assigned to the third channel. If the remainder is 0, the byte is assigned to the fourth channel.

Steps 805~807 are similar to steps 607~609.

As can be seen from the second embodiment shown in FIG. 7, 8, overhead bytes can be assigned to each channel in real time so that assignment delay can be avoided and buffer space is saved.

The process for splitting ODU2 signals is the same as that for splitting OTU2 signals. It should be noted that an ODU2 FA portion is added to the overhead portion of a signal in each channel when splitting the ODU2 signals to each channel.

The process for splitting an OTU3/ODU3 signal into 16 signals of 2.5 Gbps is similar to the principle of the first embodiment and the second embodiment described above. The only difference is that the overhead bytes, payload bytes and FEC bytes are assigned sequentially to 16 channels, and the difference is detailed below.

1. If an OTU3 signal is split according to the first embodiment as illustrated in FIG. 6, the difference with the first embodiment is as follows:

1) In step 603, the remainder a for the sequence number of the current OTU2 signal frame period divided by 16 is calculated.

2) In step 604, the byte is assigned to a corresponding channel or stored in a buffer based on the remainder a and the row sequence number b where the current byte locates in the current frame.

If the remainder a is a value among 1~15, then, when b=1, the byte is assigned to a channel of which the sequence number is the same as the remainder a. For instance, for a=5, the byte is assigned to the fifth channel. When b=2~4, the byte is stored in the buffer. If the remainder is 0, then, when b=1, the byte is assigned to the sixteenth channel; when b=2~4, the byte is stored in the buffer.

Further, like OTU2 signals, if b=2, the byte is assigned to a channel corresponding to the current remainder in a frame period posterior to the current frame period. If b=2, the byte is assigned to a channel corresponding to the current remainder in next two frame periods posterior to the current frame period. If b=4, the byte is assigned to a channel corresponding to the current remainder in next three frame periods posterior to the current frame period.

3) In step 605, the remainder of the column sequence number of the byte in the current frame divided by 16 is calculated.

Specifically, in step 606, the byte to a corresponding channel based on the remainder further includes the following steps. If the remainder is a value among 1~15, the byte is assigned to a channel of which the sequence number is the same as the remainder. For instance, if the remainder is 5, the byte is assigned to the fifth channel. If the remainder is 0, the byte is assigned to the sixteenth channel.

2. If OTU3 signal is split according to the second embodiment as illustrated in FIG. 8, the difference with the second embodiment is as follows:

1) In step 803, the remainder for the sequence number of the current OTU2 signal frame period divided by 16 is calculated and the byte is assigned to a corresponding channel based on the remainder.

If the remainder a is a value among 1~15, the byte is assigned to a channel of which the sequence number is the same as the remainder. For instance, if a=5, the byte is assigned to the fifth channel. If the remainder is 0, the byte is assigned to the sixteenth channel.

3) In step 804, the remainder of the column sequence number of the byte in the current frame divided by 16 is calculated.

Specifically, in step 804, the byte to a corresponding channel based on the remainder further includes the following steps. If the remainder is a value among 1~15, the byte is assigned to a channel of which the sequence number is the same as the remainder. For instance, if the remainder is 5, the byte is assigned to the fifth channel. If the remainder is 0, the byte is assigned to the sixteenth channel.

Figure 9:
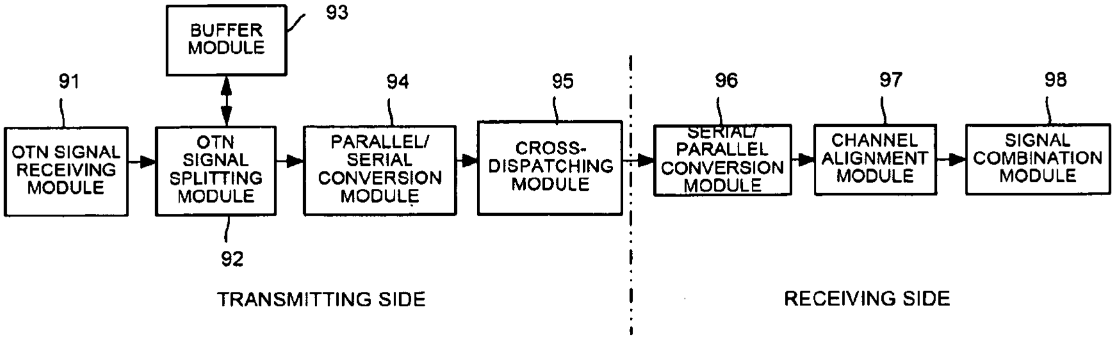
FIG. 9 illustrates a block diagram of an apparatus for managing OTUk/ODUk (k=2, 3) signals according to a first embodiment of the present invention.

FIG. 9 is block diagram of an apparatus for OTN signal dispatching according to the first embodiment of the present invention. As shown in FIG. 9, the apparatus primarily includes an OTN signal receiving module 91, an OTN signal splitting module 92, a buffer module 93, a parallel/serial conversion module 94, a cross-dispatching and dispatching module 95, a serial/parallel conversion module 96, a channel alignment module 97 and a signal combination module 98.

The OTN signal receiving module 91 is configured to send a received OTN signal frame, i.e., OTU2 signal frame or ODU2 signal frame or OTU3 signal frame or ODU3 signal frame, to the OTN signal splitting module 92.

The OTN signal splitting module 92 is configured to receive the OTN signal frame sent from the OTN signal receiving module 91, and determine whether each byte in the OTN signal frame is an overhead byte. If the byte is an overhead byte and if it is detected that the byte includes FA data, the byte is assigned in sequence to a corresponding channel based on the sequence number of OTN signal frame period and the byte and the channel sequence number are sent to the parallel/serial conversion module 94. If the byte is an overhead byte and if it is detected that the byte does not include FA data, the byte is sent to the buffer module 93. If the byte is not an overhead byte, the byte is assigned in sequence to a corresponding channel based on the column sequence number of the byte in OTN signal frame and the byte and the channel sequence number are sent to the parallel/serial conversion module 94. The overhead byte is taken out from the buffer module 92 and assigned to a corresponding channel based on the sequence number of the OTN signal frame period, and the byte and the channel sequence number are sent to the parallel/serial conversion module 94.

The buffer module 93 is configured to receive and store the overhead bytes from the OTN signal splitting module 92.

The parallel/serial conversion module 94 is configured to receive the signals in each channel sent from the OTN signal splitting module 92 and convert the signal from the parallel signal to a serial signal, and send the serial signal to the cross-dispatch and dispatching module 95.

The cross-dispatch and dispatching module 95 is configured to receive the serial signals in each channel transmitted from the parallel/serial conversion module 94, cross-dispatch the signals in each channel according to cross-dispatching and dispatching requirement and send to the serial/parallel conversion module 96.

The serial/parallel conversion module 96 is configured to receive the serial signal in each channel transmitted from the cross-dispatching and dispatching module 95, convert the serial signal to parallel signals, and send the parallel signals to the channel alignment module 97.

The channel alignment module 97 is configured to receive the parallel signals in each channel sent from the serial/parallel conversion module 96, perform sink frame alignment on the signals in each channel based on the FA data contained in the overhead bytes in each channel, and send the aligned signals in each channel to the signal combination module 98.

The signal combination module 98 is configured to receive the signals in each channel sent from the channel alignment module 97 and combine the signals in each channel to obtain an original signal in accordance with the splitting principle at the transmitting side.

The OTN signal receiving module 91, the OTN signal splitting module 92, the buffer module 93, the parallel/serial conversion module 94, and the cross-dispatching and dispatching module 95 are located at the transmitting side. The serial/parallel conversion module 96, the channel alignment module 97 and the signal combination module 98 are located at the receiving side.

Figure 10:
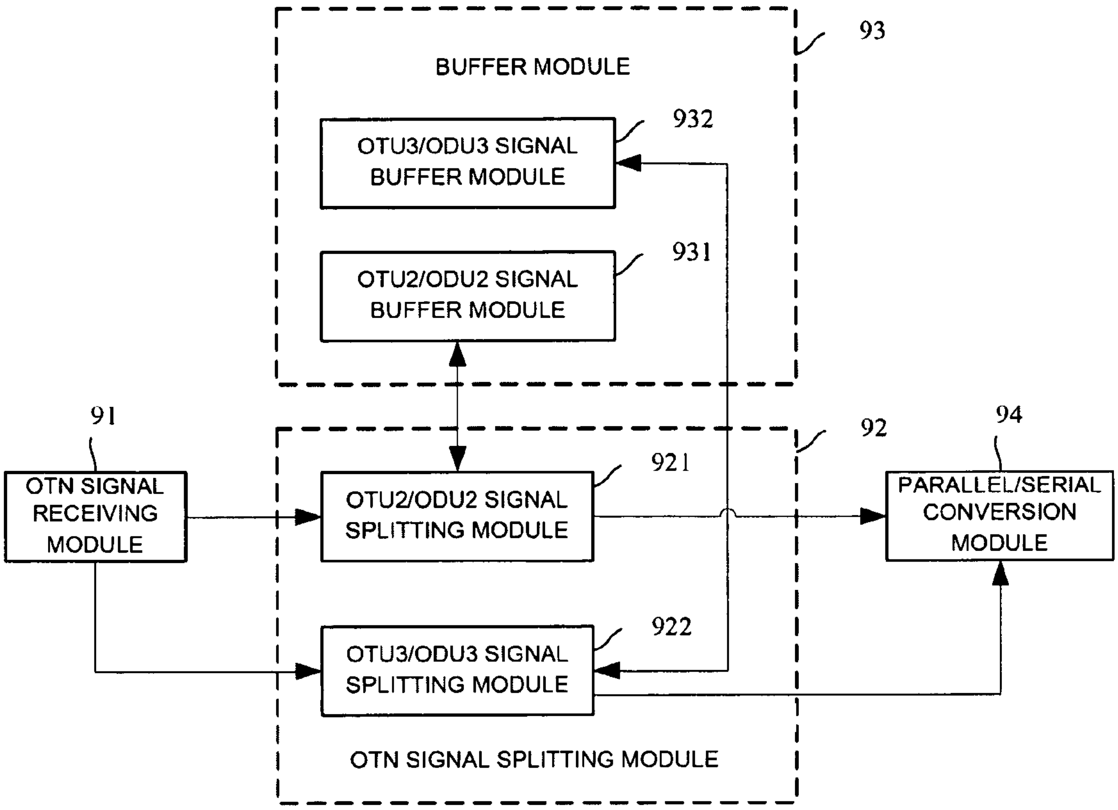
FIG. 10 illustrates a block diagram of an OTN signal splitting module and a buffer module.

In particular, as shown in FIG. 10, the OTN signal splitting module 92 includes an OTU2/ODU2 signal splitting module 921 and an OTU3/ODU3 signal splitting module 922.

The OTU2/ODU2 signal splitting module 921 is configured to receive an OTU2 signal frame or ODU2 signal frame sent from the OTN signal receiving module 91, and determine whether each byte in the OTU2 signal frame or ODU2 signal frame is an overhead byte. If the byte is an overhead byte and the byte is located in the first row, the remainder of the sequence number of the OTU2 signal frame period or ODU2 signal frame divided by 4 is calculated. If the remainder is a value among 1~3, the byte is assigned to a channel of which the channel sequence number is the same as the remainder, and the byte and the channel sequence number are sent to the parallel/serial conversion module 94. If the remainder is 0, the byte is assigned to the fourth channel and the byte and the channel sequence number are sent to the parallel/serial conversion module 94. If the byte is an overhead byte and the byte is not located in the first row, the byte is sent to an OTU2/ODU2 signal buffer module 931. If the byte is not an overhead byte, the remainder of the column sequence number of the byte divided by 4 is calculated. If the remainder is a value among 1~3, the byte is assigned to a channel of which the channel sequence number is the same as the remainder, and the byte and the channel sequence number are sent to the parallel/serial conversion module 94. If the remainder is 0, the byte is assigned to the fourth channel and the byte and the channel sequence number are sent to the parallel/serial conversion module 94. The overhead byte is taken out from the OTU2/ODU2 signal buffer module 931 and assigned to a corresponding channel based on the sequence number of the OTU2 signal frame period or ODU2 signal frame period, and the overhead byte and the channel sequence number are sent to the parallel/serial conversion module 94.

The OTU3/ODU3 signal splitting module 922 is configured to receive an OTU3 signal frame or ODU3 signal frame sent from the OTN signal receiving module 91, and determine whether each byte in the OTU3 signal frame or ODU3 signal frame is an overhead byte. If the byte is an overhead byte and the byte is located in the first row, the remainder of the sequence number of the OTU3 signal frame period or ODU3 signal frame period divided by 16 is calculated. If the remainder is a value among 1~15, the byte is assigned to a channel of which the channel sequence number is the same as the remainder, and the byte and the channel sequence number are sent to the parallel/serial conversion module 94. If the remainder is 0, the byte is assigned to the sixteenth channel and the byte and the channel sequence number is sent to the parallel/serial conversion module 94. If the byte is an overhead byte and the byte is not located in the first row, the byte is sent to an OTU3/ODU3 signal buffer module 932. If the byte is not an overhead byte, the remainder of the column sequence number of the byte divided by 16 is calculated. If the remainder is a value among 1~15, the byte is assigned to a channel of which the channel sequence number is the same as the remainder, and the byte and the channel sequence number are sent to the parallel/serial conversion module 94. If the remainder is 0, the byte is assigned to the sixteenth channel and the byte and the channel sequence number are sent to the parallel/serial conversion module 94. The overhead byte is taken out from the OTU3/ODU3 signal buffer module 932 and assigned to a corresponding channel based on the sequence number of the OTU2 signal frame period or ODU2 signal frame period, and the overhead byte and the channel sequence number are sent to the parallel/serial conversion module 94.

In addition, the buffer module 93 primarily includes the OTU2/ODU2 signal buffer module 931 and the OTU3/ODU3 signal buffer module 932.

The OTU2/ODU2 signal buffer module 931 is configured to receive and store the overhead byte of the OTU2/ODU2 signal frame sent from the OTU2/ODU2 signal splitting module 921.

The OTU3/ODU3 signal buffer module 932 is configured to receive and store the overhead byte of the OTU3/ODU3 signal frame sent from the OTU3/ODU3 signal splitting module 922.

Figure 11:
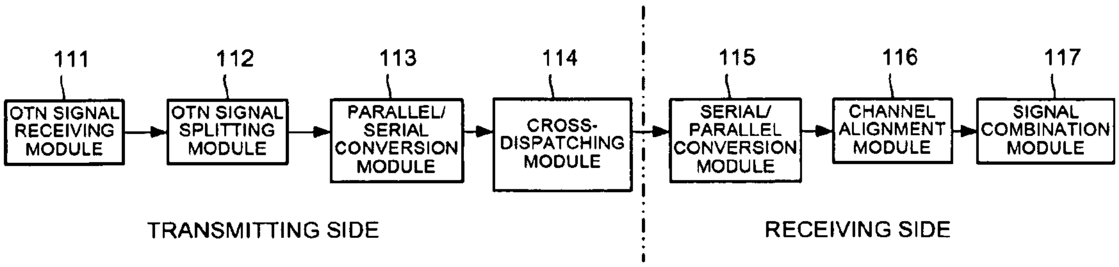
FIG. 11 illustrates a block diagram of an apparatus for managing OTUk/ODUk (k=2, 3) signals according to a second embodiment of the present invention.

FIG. 11 is block diagram of an apparatus for dispatching OTN signals according to the second embodiment of the present invention. As shown in FIG. 11, the apparatus primarily includes an OTN signal receiving module 111, an OTN signal splitting module 112, a parallel/serial conversion module 113, a cross-dispatch and dispatching module 114, a serial/parallel conversion module 115, a channel alignment module 116 and a signal combination module 117.

The OTN signal receiving module 111 is configured to send a received OTN signal frame, i.e., OTU2 signal frame or ODU2 signal frame or OTU3 signal frame or ODU3 signal frame, to the OTN signal splitting module 112.

The OTN signal splitting module 112 is configured to receive the OTN signal frame sent from the OTN signal receiving module 111, and determine whether each byte in the OTN signal frame is an overhead byte. If the byte is an overhead byte, the byte is assigned in sequence to a corresponding channel based on the sequence number of OTN signal frame period and the byte and the channel sequence number are sent to the parallel/serial conversion module 113. If the byte is not an overhead byte, the byte is assigned to a corresponding channel based on the column sequence number of the byte in OTN signal frame and the byte and the channel sequence number are sent to the parallel/serial conversion module 113.

The parallel/serial conversion module 113 is configured to receive the signals in each channel sent from the OTN signal splitting module 112 and convert the signal from the parallel signal to a serial signal, and send the serial signal to the cross-dispatch and dispatching module 114.

The cross-dispatch and dispatching module 114 is configured to receive the serial signals in each channel sent from the parallel/serial conversion module 113, cross-dispatch the signals in each channel according to cross-dispatch and dispatching requirement and send to the serial/parallel conversion module 115.

The serial/parallel conversion module 115 is configured to receive the serial signals in each channel sent from the cross-dispatch and dispatching module 114, convert the serial signal to parallel signals, and send the parallel signals to the channel alignment module 116.

The channel alignment module 116 is configured to receive the parallel signals in each channel sent from the serial/parallel conversion module 115, perform sink frame alignment on the signals in each channel based on the FA data contained in the overhead bytes on each channel, and send the aligned signals in each channel to the signal combination module 117.

The signal combination module 117 is configured to receive the signals in each channel sent from the channel alignment module 116 and combine the signals in each channel to obtain an original signal in accordance with the splitting principle at the transmitting side.

The OTN signal receiving module 111, the OTN signal splitting module 112, the parallel/serial conversion module 113, the cross-dispatch and dispatching module 114 are located at the transmitting side. The serial/parallel conversion module 115, the channel alignment module 116 and the signal combination module 117 are located at the receiving side.

Figure 12:
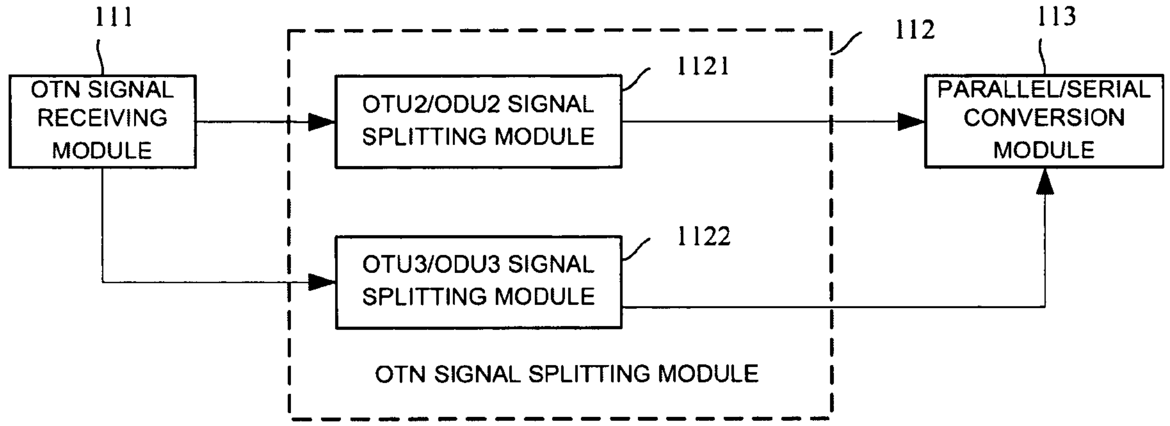
FIG. 12 illustrates a block diagram of the OTN signal splitting module according to a second embodiment of the present invention.

In particular, as shown in FIG. 12, the OTN signal splitting module 112 includes an OTU2/ODU2 signal splitting module 1121 and an OTU3/ODU3 signal splitting module 1122.

The OTU2/ODU2 signal splitting module 1121 is configured to receive an OTU2 signal frame or ODU2 signal frame sent from the OTN signal receiving module 111, and determine whether each byte in the OTU2 signal frame or ODU2 signal frame is an overhead byte. If the byte is an overhead byte, the remainder of the sequence number of the OTU2 signal frame period or ODU2 signal frame period divided by 4 is calculated. If the remainder is a value among 1~3, the byte is assigned to a channel of which the channel sequence number is the same as the remainder, and the byte and the channel sequence number are sent to the parallel/serial conversion module 113. If the remainder is 0, the byte is assigned to the fourth channel and the byte and the channel sequence number are sent to the parallel/serial conversion module 113. If the byte is not an overhead byte, the remainder of the column sequence number of the byte divided by 4 is calculated. If the remainder is a value among 1~3, the byte is assigned to a channel of which the channel sequence number is the same as the remainder, and the byte and the channel sequence number are sent to the parallel/serial conversion module 113. If the remainder is 0, the byte is assigned to the fourth channel and the byte and the channel sequence number is sent to the parallel/serial conversion module 113.

The OTU3/ODU3 signal splitting module 1122 is configured to receive an OTU3 signal frame or ODU3 signal frame sent from the OTN signal receiving module 111, and determine whether each byte in the OTU3 signal frame or ODU3 signal frame is an overhead byte. If the byte is an overhead byte, the remainder of the sequence number of the OTU3 signal frame period or ODU3 signal frame period divided by 16 is calculated. If the remainder is a value among 1~15, the byte is assigned to a channel of which the channel sequence number is the same as the remainder, and the byte and the channel sequence number are sent to the parallel/serial conversion module 113. If the remainder is 0, the byte is assigned to the sixteenth channel and the byte and the channel sequence number are sent to the parallel/serial conversion module 113. If the byte is not an overhead byte, the remainder of the column sequence number of the byte divided by 16 is calculated. If the remainder is a value among 1~15, the byte is assigned to a channel of which the channel sequence number is the same as the remainder, and the byte and the channel sequence number are sent to the parallel/serial conversion module 113. If the remainder is 0, the byte is assigned to the sixteenth channel and the byte and the channel sequence number are sent to the parallel/serial conversion module 113.

The foregoing are merely preferred embodiments of the present invention, which not be construed as limitation to the present invention. Any modifications, equivalents, improvements, etc., made within the spirit and principle of the present invention fall within the scope of the present invention.

What is claimed is:

1. A method for dispatching optical transport network (OTN) signals, wherein the OTN signals comprise a plurality of OTN signal frames with a frame period, wherein the method comprises:

receiving, at a transmitting side, an OTN signal frame with a frame period sequence number, wherein the OTN signal frame comprises one or more sections and each section comprises a set of successive overhead bytes followed by a plurality of non-overhead bytes;

splitting each section of the OTN signal frame by:

determining whether the set of successive overhead bytes in the section includes frame alignment data;

if the set of successive overhead bytes includes the frame alignment data, assigning the set to one of a plurality of channels based on the frame period sequence number of the OTN signal frame, in current frame period, or if the set of successive overhead bytes does not include the frame alignment data, storing the set in a buffer; and assigning each non-overhead byte in the section to one of the plurality of channels based on a location of the non-overhead byte in the section of the OTN signal frame, in current frame period; converting the assigned bytes in each channel of the plurality of channels from a parallel form to a serial form, and sending the bytes in the serial form in each channel to a receiving side;

wherein the bytes in the serial form in each channel are converted by the receiving side to the bytes in the parallel form; and the receiving side performs a sink frame alignment on the bytes in the parallel form in each channel based on the frame alignment data contained in one of the sets of successive overhead bytes, and combines the aligned bytes in the parallel form in each channel for obtaining the OTN signal frame.

2. The method of claim 1, wherein the OTN signal frame is an optical channel transport unit-2 (OTU2) signal frame or an optical channel data unit-2 (ODU2) signal frame, the OTU2 or ODU2 signal frame comprises 4 sections, the set of successive overhead bytes comprises 16 bytes, locations of the non-overhead bytes in each section are indicated by column sequence numbers, the number of the channels is 4, and each channel is associated with a sequence number from 1 to 4, wherein the assigning the set of 16 successive overhead bytes that includes the frame alignment data to one of the 4 channels comprises:

dividing the frame period sequence number of the OTU2 or ODU2 signal frame by 4 to obtain a first remainder;

if the first remainder is 1, 2 or 3, assigning the set of 16 successive overhead bytes to a channel of the 4 channels, wherein the sequence number of the channel is the same as the first remainder, or if the first remainder is 0, assigning the set of 16 successive overhead bytes to a channel with a sequence number of 4;

and wherein the assigning each non-overhead byte in each section to one of the 4 channels comprises:

dividing a column sequence number of a non-overhead byte in the section by 4 to obtain a second remainder;

if the second remainder is 1, 2, or 3, assigning the non-overhead byte to a channel of the 4 channels, wherein the sequence number of the channel is the same as the second remainder, or if the second remainder is 0, assigning the non-overhead byte to a channel with a sequence number of 4.

3. The method of claim 2, wherein only the set of 16 successive overhead bytes in the first section of the OTN signal frame includes the frame alignment data, wherein if the first remainder is 1, the method further comprises:

assigning the set of 16 successive overhead bytes of section 4 of the OTN signal frame stored in the buffer in the third frame period after the current frame period of sending the OTN signal frame to the first channel of the 4 channels;

assigning the set of 16 successive overhead bytes in section 3 of the OTN signal frame stored in the buffer in the second frame period after the current frame period of sending the OTN signal frame to the first channel of the 4 channels; and assigning the set of 16 successive overhead bytes in section 2 of the OTN signal frame stored in the buffer in the first frame period after the current frame period of sending the OTN signal frame to the first channel of the 4 channels;

if the first remainder is 2, the method further comprises:

assigning the set of 16 successive overhead bytes in section 4 of the OTN signal frame stored in the buffer in the third frame period after the current frame period of sending the OTN signal frame to the second channel of the 4 channels;

assigning the set of 16 successive overhead bytes in section 3 of the OTN signal frame stored in the buffer in the second frame period after the current frame period of sending the OTN signal frame to the second channel of the 4 channels;

assigning the set of 16 successive overhead bytes in section 2 of the OTN signal frame stored in the buffer in the first frame period after the current frame period of sending the OTN signal frame to the second channel of the 4 channels;

if the first remainder is 3, the method further comprises:

assigning the set of 16 successive overhead bytes in section 4 of the OTN signal frame stored in the buffer in the third frame period after the current frame period of sending the OTN signal frame to the third channel of the 4 channels;

assigning the set of 16 successive overhead bytes in section 3 of the OTN signal frame stored in the buffer in the second frame period after the current frame period of sending the OTN signal frame to the third channel of the 4 channels;

assigning the set of 16 successive overhead bytes in section 2 of the OTN signal frame stored in the buffer in the first frame period after the current frame period of sending the OTN signal frame to the third channel of the 4 channels;

if the first remainder is 0, the method further comprises:

assigning the set of 16 successive overhead bytes in section 4 of the OTN signal frame stored in the buffer in the third frame period after the current frame period of sending the OTN signal frame to the fourth channel of the 4 channels;

assigning the set of 16 successive overhead bytes in section 3 of the OTN signal frame stored in the buffer in the second frame period after the current frame period of sending the OTN signal frame to the fourth channel of the 4 channels;

assigning the set of 16 successive overhead bytes in section 2 of the OTN signal frame stored in the buffer in the first frame period after the current frame period of sending the OTN signal frame to the fourth channel of the 4 channels.

4. The method of claim 1, wherein the OTN signal frame is an optical channel transport unit-3 (OTU3) signal frame or an optical channel data unit-3 (ODU3) signal frame, the OTU3 or ODU3 signal frame comprises 16 sections, the set of successive overhead bytes comprises 16 bytes, locations of the non-overhead bytes in each section are indicated by column sequence numbers, the number of channels is 16, and each channel is associated with a sequence number from 1 to 16, wherein the assigning the set of 16 successive overhead bytes that includes the frame alignment data to one of the 16 channels comprises:

dividing the frame period sequence number of the OTN signal frame by 16 to obtain a first remainder;

if the first remainder is a value among 1 to 15, assigning the set of 16 successive overhead bytes that includes the frame alignment data to a channel of the 16 channels, wherein the sequence number of the channel is the same as the first remainder, or if the first remainder is 0, assigning the set of 16 successive overhead bytes that includes the frame alignment data to a channel with a sequence number of 16;

and wherein the assigning each non-overhead byte in each section to one of the 16 channels comprises:

dividing a column sequence number of each non-overhead byte in the section by 16 to obtain a second remainder;

if the second remainder is a value among 1 to 15, assigning the non-overhead byte to a channel of the 16 channels, wherein the sequence number of the channel is the same as the second remainder, or if the second remainder is 0, assigning the non-overhead byte to a channel with a sequence number 16.

5. The method of claim 1, further comprising:

assigning, in one of frame periods after the frame period for sending the OTN signal frame, the set or sets of successive overhead bytes that does not include the frame alignment data stored in the buffer to a channel of the plurality of channels based on the frame period sequence number of the OTN signal frame.

6. The method of claim 1, wherein the assigning the set of successive overhead bytes that includes the frame alignment data to one of the plurality of channels comprises:

dividing the frame period sequence number of the OTN signal frame by the number of the plurality of channels to obtain a first remainder;

assigning the set of successive overhead bytes to a channel of the plurality of channels, wherein the sequence number of the channel is the same as the first remainder;

and wherein the assigning each non-overhead byte in each section to one of the plurality of channels comprises:

dividing a column sequence number of the non-overhead byte by the number of the plurality of channels to obtain a second remainder; and assigning the non-overhead byte to a channel of the plurality of channels, wherein the sequence number of the channel is the same as the second remainder.

7. The method of claim 6, further comprising:

assigning, in one of frame periods after the frame period for sending the OTN signal frame, the set of successive overhead bytes that does not include the frame alignment data stored in the buffer to a channel of the plurality of channels, wherein the sequence number of the channel is the same as the first remainder.

8. A method for dispatching optical transport network (OTN) signals, comprising:

receiving, at a transmitting side, an OTN signal frame with a frame period sequence number, wherein the OTN signal frame comprises two or more sections, each section comprises a set of successive overhead bytes followed by a plurality of non-overhead bytes, and one of the sets of successive overhead bytes comprises frame alignment data;

splitting each section of the OTN signal frame by:

assigning the set of successive overhead bytes to one of the plurality of channels based on the frame period sequence number of the OTN signal frame;

assigning each non-overhead byte in the section to one of the plurality of channels based on a location of the non-overhead byte in the section of the OTN signal frame;

converting the assigned bytes in each channel of the plurality of channels from a parallel form to a serial form, and sending the bytes in the serial form in each channel to a receiving side in a frame period;

wherein the bytes in the serial form in each channel are converted by the receiving side to the bytes in the parallel form; and the receiving side performs a sink frame alignment on the bytes in the parallel form in each channel based on frame alignment data contained in one of the sets of successive overhead bytes, and combines the aligned bytes in the parallel form in each channel for obtaining the OTN signal frame.

9. The method of claim 8, wherein the OTN signal frame is an optical channel transport unit-2 (OTU2) signal frame or an optical channel data unit-2 (ODU2) signal frame, the OTU2 or ODU2 signal frame comprises 4 sections, the set of successive overhead bytes comprises 16 bytes, locations of the non-overhead bytes in each section are indicated by column sequence numbers, the number of the channels is 4, and each channel is associated with a sequence number from 1 to 4, wherein the assigning the set of 16 successive overhead bytes to one of the 4 channels comprises:

dividing the frame period sequence number of the OTU2 or ODU2 signal frame by 4 to obtain a first remainder;

if the first remainder is 1, 2 or 3, assigning the set of 16 successive overhead bytes to a channel of the 4 channels, wherein the sequence number of the channel is the same as the first remainder, or if the first remainder is 0, assigning the set of 16 successive overhead bytes to a channel with a sequence number 4;

and wherein the assigning each non-overhead byte in each section to one of the 4 channels comprises:

dividing a column sequence number of each non-overhead byte in the section by 4 to obtain a second remainder;

if the second remainder is 1, 2, or 3, assigning the non-overhead byte to a channel of the 4 channels, wherein the sequence number of the channel is the same as the second remainder, or if the second remainder is 0, assigning the non-overhead byte to a channel with a sequence number 4.

10. The method of claim 8, wherein the OTN signal frame is an optical channel transport unit-3 (OTU3) signal frame or an optical channel data unit-3 (ODU3) signal frame, the OTU3 or ODU3 signal frame comprises 16 sections, the set of successive overhead bytes comprises 16 bytes, locations of the non-overhead bytes in each section are indicated by column sequence numbers, the number of channels is 16, and each channel has a sequence number from 1 to 16, wherein the assigning the set of 16 successive overhead bytes that includes the frame alignment data to one of the 16 channels comprises:

dividing the frame period sequence number of the OTU3 or ODU3 signal frame by 16 to obtain a first remainder;

if the first remainder is a value among 1 to 15, assigning the set of 16 successive overhead bytes to a channel of the 16 channels, wherein the sequence number of the channel is the same as the first remainder, or if the first remainder is 0, assigning the set of 16 successive overhead bytes to a channel with a sequence number of 16;

and wherein the assigning each non-overhead byte in each section to one of the 16 channels comprises:

dividing a column sequence number of each non-overhead byte in the section by 16 to obtain a second remainder;

if the second remainder is a value among 1 to 15, assigning the non-overhead byte to a channel of the 16 channels, wherein the sequence number of the channel is the same as the second remainder, or if the second remainder is 0, assigning the non-overhead byte to a channel with a sequence number 16.

11. A system for dispatching optical transport network (OTN) signals, comprising: a transmitting side and a receiving side;

wherein the transmitting side comprises:

an OTN signal receiving module, configured to receive an OTN signal frame with a frame period sequence number, wherein the OTN signal frame comprises one or more sections and each section comprises a set of successive overhead bytes followed by a plurality of non-overhead bytes;

an OTN signal splitting module, configured to: split each section of the OTN signal frame by:

determining whether the set of successive overhead bytes in the section includes frame alignment data;

if the set of successive overhead bytes includes the frame alignment data, assigning the set to one of a plurality of channels based on the frame period sequence number of the OTN signal frame, or if the set of successive overhead bytes does not include the frame alignment data, sending the set to a buffer module; and assigning each non-overhead byte in the section to one of the plurality of channels based on a location of the non-overhead byte in the section of the OTN signal frame;

the buffer module, configured to store the set of successive overhead bytes that does not include the frame alignment data; a parallel/serial conversion module, configured to convert the assigned bytes in each channel from a parallel form to a serial form, and send the bytes in the serial form to the receiving side in a frame period; and wherein the receiving side comprises:

a serial/parallel conversion module, configured to convert the bytes in the serial form in each channel to the bytes in the parallel form; a channel alignment module, configured to perform a sink frame alignment on the bytes in the parallel form in each channel based on the frame alignment data contained one of the sets of successive overhead bytes; and a signal combination module, configured to combine the aligned bytes in the parallel form in each channel for obtaining the OTN signal frame.

12. The system of claim 11, wherein the OTN signal frame is an optical channel transport unit-2 (OTU2) signal frame or an optical channel data unit-2 (ODU2) signal frame, the OTU2 or ODU2 signal frame comprises 4 sections, the set of successive overhead bytes comprises 16 bytes, locations of the non-overhead bytes in each section are indicated by column sequence numbers, the number of the channels is 4, and each channel has a sequence number from 1 to 4, wherein in assigning the set of 16 successive overhead bytes that includes the frame alignment data to one of the 4 channels, the OTN signal splitting module is configured to:

divide the frame period sequence number of the OTN signal frame by 4 to obtain a first remainder;

if the first remainder is 1, 2 or 3, assign the set of 16 successive overhead bytes to a channel of the 4 channels, wherein the sequence number of the channel is the same as the first remainder, or if the first remainder is 0, assign the set of 16 successive overhead bytes to a channel with a sequence number of 4 of the 4 channels;

and wherein in assigning each non-overhead byte in the section to one of the 4 channels, the OTN signal splitting module is configured to:

divide a column sequence number of each non-overhead byte in the section by 4 to obtain a second remainder;

if the second remainder is 1, 2, or 3, assign the non-overhead byte to a channel of the 4 channels, wherein the sequence number of the channel is the same as the second remainder, or if the second remainder is 0, assign the non-overhead byte to a channel with a sequence number of 4 of the 4 channels.

13. The system of claim 11, wherein the OTN signal frame is an optical channel transport unit-3 (OTU3) signal frame or an optical channel data unit-3 (ODU3) signal frame, the OTU3 or ODU3 signal frame comprises 16 sections, the set of successive overhead bytes comprises 16 bytes, locations of the non-overhead bytes in each section are indicated by column sequence numbers, the number of channels is 16, and each channel has a sequence number from 1 to 16, wherein in assigning the set of 16 successive overhead bytes that includes the frame alignment data to one of the 16 channels, the OTN signal splitting module is configured to:

divide the frame period sequence number of the OTN signal frame by 16 to obtain a first remainder;

if the first remainder is a value among 1 to 15, assign the set of 16 successive overhead bytes that includes the frame alignment data to a channel of the 16 channels, wherein the sequence number of the channel is the same as the first remainder, or if the first remainder is 0, assign the set of 16 successive overhead bytes that includes the frame alignment data to a channel with a sequence number of 16;

and wherein in assigning each non-overhead byte in the section to one of the 16 channels, the OTN signal splitting module is configured to:

divide a column sequence number of each non-overhead byte in the section by 16 to obtain a second remainder;

if the second remainder is a value among 1 to 15, assign the non-overhead byte to a channel of the 16 channels, wherein the sequence number of the channel is the same as the second remainder, or if the second remainder is 0, assign the non-overhead byte to a channel with a sequence number 16.

14. A system for dispatching optical transport network (OTN) signals, comprising: a transmitting side and a receiving side;

wherein the transmitting side comprises:

an OTN signal receiving module, configured to receive an OTN signal frame with a frame period sequence number, wherein the OTN signal frame comprises two or more sections, each section comprises a set of successive overhead bytes followed by a plurality of non-overhead bytes, one of the sets comprises frame alignment data;

an OTN signal splitting module, configured to split each section of the OTN signal frame by:

assigning the set of successive overhead bytes to one of the plurality of channels based on the frame period sequence number of the OTN signal frame; and assigning each non-overhead byte in the section to one of the plurality of channels based on a location of the non-overhead byte in the section of the OTN signal frame;

a parallel/serial conversion module, configured to convert the assigned bytes in each channel of the plurality of channels from a parallel form to a serial form, and send the bytes in the serial form in each channel to the receiving side in a frame period; and wherein the receiving side comprises:

a serial/parallel conversion module, configured to convert the bytes in the serial form in each channel to the bytes in the parallel form; a channel alignment module, configured to perform a sink frame alignment on the bytes in the parallel form in each channel based on the frame alignment data contained in one of the sets of successive overhead bytes; a signal combination module, configured to combine the aligned bytes in the parallel form in each channel to obtain the OTN signal frame.

15. The system of claim 14, wherein the OTN signal frame is an optical channel transport unit-2 (OTU2) signal frame or an optical channel data unit-2 (ODU2) signal frame, the OTU2 or ODU2 signal frame comprises 4 sections, the set of successive overhead bytes comprises 16 bytes, locations of the non-overhead bytes in each section are indicated by column sequence numbers, the number of the channels is 4, and each channel has a sequence number from 1 to 4, wherein in assigning the set of 16 successive overhead bytes to one of the 4 channels, the OTN signal splitting module is configured to:

divide the frame period sequence number of the OTN signal frame by 4 to obtain a first remainder;

if the first remainder is 1, 2 or 3, assign the set of 16 successive overhead bytes to a channel of the 4 channels, wherein the sequence number of the channel is the same as the first remainder, or if the first remainder is 0, assign the set of 16 successive overhead bytes to a channel with a sequence number 4 of the 4 channels;

and wherein in assigning each non-overhead byte in the section to one of the 4 channels, the OTN signal splitting module is configured to:

divide a column sequence number of each non-overhead byte in the section by 4 to obtain a second remainder;

if the second remainder is 1, 2, or 3, assign the non-overhead byte to a channel of the 4 channels, wherein the sequence number of the channel is the same as the second remainder, or if the second remainder is 0, assign the non-overhead byte to a channel with a sequence number 4 of the 4 channels.

16. The system of claim 14, wherein the OTN signal frame is an optical channel transport unit-3 (OTU3) signal frame or an optical channel data unit-3 (ODU3) signal frame, the OTU3 or ODU3 signal frame comprises 16 sections, the set of successive overhead bytes comprises 16 bytes, locations of the non-overhead bytes in each section are indicated by column sequence numbers, the number of channels is 16, and each channel has a sequence number from 1 to 16, wherein in assigning the set of 16 successive overhead bytes that includes the frame alignment data to one of the 16 channels, the OTN signal splitting module is configured to:

divide the frame period sequence number of the OTN signal frame by 16 to obtain a first remainder;

if the first remainder is a value among 1 to 15, assign the set of 16 successive overhead bytes that includes the frame alignment data to a channel of the 16 channels, wherein the sequence number of the channel is the same as the first remainder, or if the first remainder is 0, assign the set of 16 successive overhead bytes that includes the frame alignment data to a channel with a sequence number of 16;

and wherein in the assigning each non-overhead byte in the section to one of the 16 channels, the OTN signal splitting module is configured to:

divide a column sequence number of each non-overhead byte in the section by 16 to obtain a second remainder;

if the second remainder is a value among 1 to 15, assign the non-overhead byte to a channel of the 16 channels, wherein the sequence number of the channel is the same as the second remainder, or if the second remainder is 0, assign the non-overhead byte to a channel with a sequence number 16.

* * * * *